Dec. 15, 1936.　　　G. W. PIERCE　　　2,063,945
DIAPHRAGM AND METHOD
Filed Aug. 2, 1933
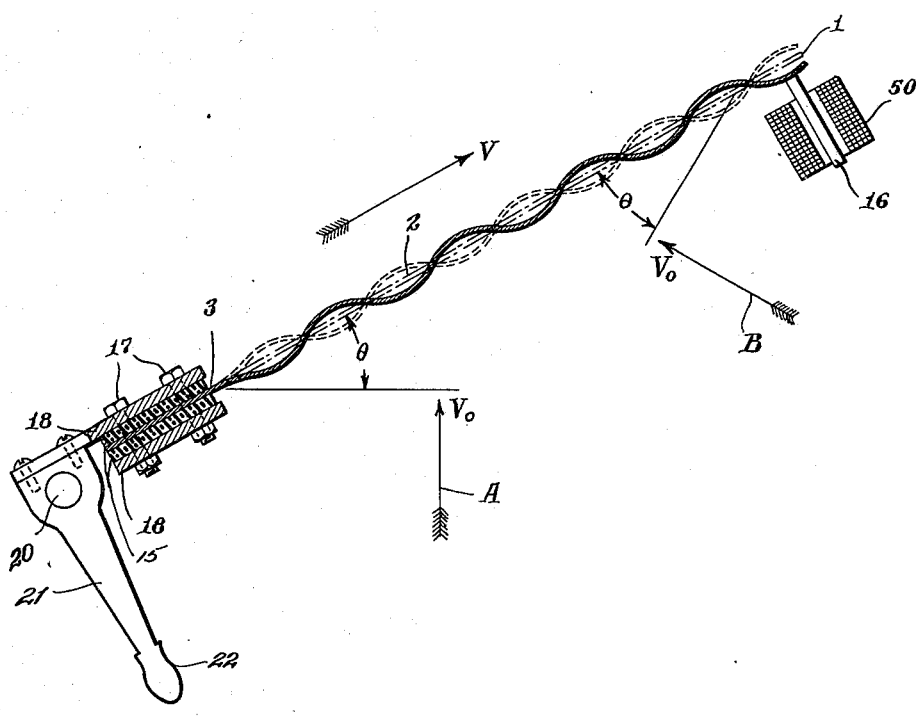
Inventor
George W. Pierce
by David Vine
Attorney Patented Dec. 15, 1936

2,063,945

UNITED STATES PATENT OFFICE 2,063,945

DIAPHRAGM AND METHOD

George Washington Pierce, Cambridge, Mass.

Application August 2, 1933, Serial No. 683,350

24 Claims. (Cl. 181—31)

The present invention relates to the transmission and reception of intelligence, using sound waves as the agency of communication, and more particularly to methods of and means for directively discriminating a sound beam. The term "sound" will be employed hereinafter, in the specification and the claims, to include the supersonic, as well as the audible, part of the sound spectrum, and to include also all kinds of elastic vibrations. The invention, indeed, finds particular application to supersonic communication. From a more limited aspect still, the invention relates to diaphragms.

In a copending application, Serial No. 591,838, filed February 9, 1932, there is disclosed a vibratory diaphragm, which may or may not be in plate form, adapted to be disposed in a sound-conducting medium at an angle to a beam of signal sound. The diaphragm may be set into vibration by the sound beam or, conversely the sound beam may be produced by the vibrations of the diaphragm. The inclination of the diaphragm to the sound beam is such that the periodic impulses of pressure of the sound beam all strike certain points of the diaphragm in the same phase, say a push; and the rarified impulses similarly all strike other points in phase, say a pull. Measuring distances in the direction of propagation of the sound beam in the medium, these alternate high-pressure and low-pressure points are spaced a half-wavelength apart.

The diaphragm itself is capable of vibrating transversely in a harmonic mode, with nodal points at half-wavelength intervals along it, and regions of vibration between nodes, the vibration on one side of a node being opposite in phase to that on the other side. The length of the half-wavelength spacing between these regions of opposite vibration depends upon the rigidity of the plate and upon the frequency.

If, at any given frequency, the half-wavelength of transverse vibration in the diaphragm is greater than the half-wavelength of the longitudinal waves in the medium, it is possible to turn the plate at such an angle to the sound beam as to produce cumulative interaction between the pressure fluctuations in the medium along the diaphragm and the vibrations of the diaphragm itself. Under these conditions, the sound wave in the medium strikes all vibratory regions in the diaphragm in the proper phase to enhance the vibration. If, however, the diaphragm be turned away from this proper angle, cumulative interaction between the vibrating segments of the plate and the vibration in the medium no longer occurs and the vibration of the plate becomes very much less. When this cumulative interaction occurs, we may say that there is spatial resonance between the diaphragm and the vibrations in the medium.

The invention finds many uses; among them, owing to its directive discrimination of sound beams, direction finding. As the diaphragm occupies a given angle corresponding to resonant response to the sound beam, it is possible to determine the direction of the sound beam; and as departure from the angle associated with resonance carries with it non-resonance, it is possible to obtain a very sharp determination of direction.

The invention will now be explained in connection with the accompanying drawing, the single figure of which is a diagrammatic end view of a diaphragm embodying the present invention, the mounting thereof being shown in longitudinal section.

The diaphragm, shown in continuous plate form, is indicated at 2. The two directions from which a sound beam reinforces transverse vibration along the plate are indicated by the arrows A and B.

At any given frequency, a transverse wave can be propagated in either direction along the diaphragm, with a velocity determined by the rigidity of the diaphragm and by the frequency. Referring to the drawing, let this velocity along the plate, at any given frequency, be represented by V. Let the incident sound be coming from the direction A with a velocity in the medium $V_0$. If V is greater than $V_0$, it is possible, obviously, to set the diaphragm at such an angle $\theta$ to the plane-wave front that an impulse in the medium, first striking the diaphragm at the lower end point 3, will, after traveling as a transverse vibration in the diaphragm, arrive at the other end 1 (or at any intermediate point) at the same instant that the impulse which started it, traveling onward through the medium, reaches the same point. In other words, the transverse wave, traveling from 3 to 1 in the plate, is in phase with the wave in the medium responsible for it all along the plate. Thus, at this particular angle $\theta$ of maximum response for the particular frequency of the signal sound wave, the incident wave in the medium builds up an intense transverse vibration in the plate. Obviously, this correct angle $\theta$ is such that $$\sin \theta = \frac{V_0}{V}$$

This transverse wave in the plate, when it reaches the boundary of the diaphragm, is reflected, and travels back along the diaphragm in the opposite direction, but with the velocity V. It is the combination of these two transverse waves, traveling in opposite directions in the plate 2, that gives rise to the standing wave system with multiple nodes previously referred to.

The wave, returning after reflection, has a progressively varying phase relation to the wave in the medium and is therefore not much influenced by it. If, however, the plate is of such length that this second wave is reflected again at 3, to produce a third wave, this time traveling from 3 to 1, which is in phase with the original wave from 3 to 1, so as to aid it at all points, the vibrations are enhanced and we say that the plate is resonant to the frequency used. Thus, at certain frequencies which resonate the diaphragm, the sensitivity of the device is somewhat increased.

However, the use of this phenomenon of diaphragm resonance, since it involves reflection from both ends of the diaphragm, offers a serious disadvantage, namely, that the diaphragm responds equally well to sound from two different directions.

Referring again to the drawing, let the unit 16, which converts vibrational energy into electrical energy, be situated at the end 1 of the diaphragm. We have seen that sound from the direction A will reinforce the vibration all along the diaphragm and produce a large vibration at 1. Similarly, it is obvious that sound from the symmetrical direction B will reinforce a vibration traveling from 1 to 3 and produce a large vibration at 3. If, now, 3 is an ordinary boundary of the diaphragm, this vibration will be reflected almost completely at 3 and retrace its path along the diaphragm to 1, arriving there with practically undiminished amplitude. Thus, sound from either A or B will violently actuate the unit 16. This would yield a second angle of maximum response.

This fact was recognized in the said copending application Serial No. 591,838, and various means, such as wing and cone diaphragms, were disclosed for obviating the double angle ambiguity.

With a given properly designed plate diaphragm, therefore, there are, for each of a large number of selected sound frequencies, two angles of maximum response, and among the objects of the present invention is to eliminate one of the two angles of response in a plate diaphragm.

From the foregoing discussion, it is evident that if reflection does not occur at 3, sound from the direction B will not actuate the converter 16.

I have found, after considerable experimenting, that reflections of transverse waves can be largely eliminated at 3 by clamping the end 3 of the diaphragm between plates of damping rubber 15, held between rigid compressing plates 18 drawn together by bolts 17. For best results, it is advisable to tighten the clamping bolts unequally, those nearest point 3 being less tight than those farther away so that the rubber bears progressively more firmly on the diaphragm as we move to the left from point 3 in the drawing. The reason for this is that if the clamping is too tight at 3, considerable energy will be reflected without ever entering the damper region.

The diaphragm may, of course, be clamped in some other sound-absorbing medium than rubber, and the clamping may be at some other boundary than the end 3.

When the diaphragm is so damped, then, sound from A, at an angle $\theta$ to the diaphragm such that $$\sin \theta = \frac{V_0}{V}$$

reinforces a vibration traveling from 3 to 1 in the diaphragm and actuates the converting unit 16 violently. Sound from B, making again an angle $\theta$ with the diaphragm, similarly reinforces a vibration traveling in the diaphragm from 1 to 3, but this vibration is absorbed in the damping rubber 15 and is not allowed to return to unit 16.

The diaphragm may be made rotatably adjustable for cumulative interaction with sound from any given direction; for instance, one of the clamping plates 18 may be rigidly secured to an arm 21 which is rotatable on a pivot 20 and which carries a handle 22 for manually rotating the diaphragm. Or, again, the whole unit may be mounted in a housing (not shown) attached to the clamping plates 18, and the whole housing made rotatably adjustable. A scale and pointer (not shown) may be utilized to indicate the angular position of the diaphragm, from which the direction of incoming sound which actuates the diaphragm may be ascertained.

The unit 16, as previously disclosed in the said application Serial No. 591,838, may be a magnetostrictive core associated with a pick-up coil 50, as shown, a piezo-electric crystal, a magnetophone armature, a microphone, or any other device for obtaining electrical energy from mechanical motion, or vice versa. The voltages or currents developed may be fed into an amplifier (not shown) as explained in the said application.

Similarly, since the operation of the device is completely reversible, the diaphragm may be used for transmission. In this case, electrical energy is fed to the transfer unit 16 (from an oscillator, say). A transverse wave then originates at 1 and travels down the diaphragm with velocity V to 3, where the energy which has not been radiated is absorbed in the damping mechanism. This transverse wave, traveling down the diaphragm, will produce a beam of sound in the medium in a direction opposite to A.

The angle $\theta$ at which sound is received or radiated is, as previously shown, dependent upon the velocity V of propagation of transverse waves in the diaphragm. This velocity V depends not only on the material of the diaphragm, but also on its thickness and upon the frequency, and all these factors should be considered in designing the apparatus.

Considerable analysis of this question has been carried out by me in connection with this application. Mathematical analysis of transverse vibrations in a plate yields the approximate equation $$V = \sqrt{fbD}$$

where $f$ is the frequency of vibration,
   D is the thickness of the diaphragm, and
   b is a constant of the material of the diaphragm.

If dimensions are measured in centimeters and frequency in cycles per second, $b$, for aluminum, is approximately $0.95 \times 10^6$. For brass it is about $.67 \times 10^6$.

Modifications will obviously occur to persons skilled in the art, and all such are considered to fall within the spirit and scope of the invention as defined in the appended claims.

What is claimed is:

1. A method of cumulatively interacting between a sound beam having a predetermined direction in a sound-conducting medium and a diaphragm mechanically coupled to the medium, that comprises propagating a transverse vibration along the diaphragm with a velocity having a component, in the said predetermined direction, equal to the velocity of the beam in the medium, and dissipating the energy of said transverse vibration at one end of the diaphragm.

2. A method of cumulatively interacting between a sound beam having a predetermined direction in a sound-conducting medium and a diaphragm mechanically coupled to the medium, that comprises disposing the diaphragm at an angle to the sound beam such that the transverse vibration produced along the diaphragm by the sound beam shall have a component in the said predetermined direction, of a velocity equal to the velocity of the beam in the medium, and dissipating the energy of said transverse vibration at one end of the diaphragm.

3. A method of cumulatively interacting between a sound beam having a predetermined direction in a sound-conducting medium and a diaphragm mechanically coupled to the medium, that comprises disposing the diaphragm at an angle to the sound beam such that the transverse vibration produced along the diaphragm by the high-frequency components of the sound beam shall have a component of velocity, in the said predetermined direction, equal to the velocity of the beam in the medium, and dissipating the residual energy of said transverse vibration at one end of the diaphragm.

4. A method of propagating a sound beam from a diaphragm in a medium to which the diaphragm is coupled that comprises exciting the diaphragm into periodic, transverse vibration traveling along the diaphragm with a velocity having a component in the direction of the beam equal to the velocity of propagation of the beam in the medium, and dissipating the residual energy of said transverse vibration at one end of the diaphragm.

5. A system for the directive discrimination of a sound beam having a predetermined direction in a sound-conducting medium comprising a diaphragm transversely vibratory, having a velocity of propagation of transverse wave vibration dependent upon the frequency of vibration and having a dimension in the direction of propagation of said transverse waves large in comparison with the wavelength of said transverse vibration, said vibration being excited by said sound beam, and said diaphragm being disposable in the medium at an angle to the beam such as to produce cumulative interaction between the beam in the medium and the vibration in the diaphragm an interconverter of mechanical and electrical energy connected with the diaphragm, and means for dissipating the residual energy of said transverse vibration at one end of the diaphragm.

6. A system for the directive discrimination of a sound beam having a predetermined direction in a sound-conducting medium comprising a diaphragm transversely vibratory having a velocity of propagation of transverse wave vibration dependent upon the frequency of vibration and having a dimension in the direction of propagation of said transverse waves large in comparison with the wavelength of said transverse vibration, said vibration being excited by said sound beam, and said diaphragm being disposable in the medium at an angle to the beam such as to produce cumulative interaction between the beam in the medium and the vibration in the diaphragm, an interconverter of mechanical and electrical energy connected with the diaphragm and means for preventing reflection of said vibration at a boundary of the diaphragm.

7. A system for the directive discrimination of a sound beam consisting of a transversely vibratory diaphragm having a velocity of propagation of transverse-wave vibration dependent upon the frequency of vibration and having a dimension in the direction of propagation of said transverse waves large in comparison with the wavelength of said transverse vibration, the said diaphragm being disposable at an angle to said sound beam such as to produce cumulative interaction between the vibrations of the diaphragm and the vibrations of the beam, means for vibrating the diaphragm, and means for dissipating the energy of said vibration of the diaphragm and rendering the diaphragm unidirectionally selective.

8. A system for the directive discrimination of a sound beam comprising a diaphragm having a velocity of propagation of transverse-wave vibration dependent upon the frequency of vibration and having a dimension in the direction of propagation of said transverse waves large in comparison with the wavelength of said transverse vibration, the said diaphragm being responsive to a superaudible component of the beam, means associated with the diaphragm for determining the direction of the superaudible component, an interconverter of mechanical and electrical energy connected with the diaphragm, and means for dissipating the energy of said vibration of the diaphragm and rendering the diaphragm unidirectionally selective.

9. A sound diaphragm having a velocity of propagation of transverse-wave vibration dependent upon the frequency of vibration and having a dimension in the direction of propagation of said transverse waves large in comparison with the wavelength of said transverse vibration, the said diaphragm being constituted of material of thickness D and satisfying the approximate relation $$V=\sqrt{fbD}$$

where V is the velocity of propagation of sound waves in the material of the diaphragm,
$f$ is the frequency of vibration of the sound waves, and
$b$ is a constant, an interconverter of mechanical and electrical energy connected with the diaphragm, and means for dissipating vibrational energy at one end of the diaphragm, the diaphragm being rotatably adjustable.

10. A system for the directive discrimination of a sound beam in a medium comprising a vibratory diaphragm having a velocity of propagation of transverse-wave vibration dependent upon the frequency of vibration and having a dimension in the direction of propagation of said transverse waves large in comparison with the wavelength of said transverse vibration, the said diaphragm being coupled to the medium and disposed at an angle $\theta$ with a line at right angles to the direction of the beam, such that $$\sin \theta = \frac{V_0}{V}$$

where $V_0$ is the velocity of the sound in the medium, and
V is the velocity of propagation of elastic waves in the material of the diaphragm, an interconverter of mechanical and electrical energy connected with the diaphragm, and means for dissipating vibrational energy at one end of the diaphragm.

11. A system for the interconversion of electric energy and sound energy having a component of a given frequency comprising a directively disposable diaphragm having a velocity of propagation of transverse-wave vibration dependent upon the frequency of vibration and having a dimension in the direction of propagation of said transverse waves large in comparison with the wavelength of said transverse vibration, the said diaphragm being characterized by a maximum of interconversion for a definite angle between the normal to the diaphragm and the direction of propagation of the sound energy, an interconverter of mechanical and electrical energy connected with the diaphragm, and means for dissipating vibrational energy at one end of the diaphragm.

12. A diaphragm having a velocity of propagation of transverse-wave vibration dependent upon the frequency of vibration and having a dimension in the direction of propagation of said transverse waves large in comparison with the wavelength of said transverse vibration, the said diaphragm being free at one end and damped at the other end to prevent the formation of a standing wave system and thereby eliminate one of the two angles of response of the diaphragm, and an interconverter of mechanical and electrical energy connected with the diaphragm.

13. A diaphragm having a velocity of propagation of transverse-wave vibration dependent upon the frequency of vibration and having a dimension in the direction of propagation of said transverse waves large in comparison with the wavelength of said transverse vibration, the said diaphragm being free at one end and clamped at a boundary in a sound-absorbing medium to prevent reflection from said boundary of transverse vibration in the diaphragm, and an interconverter of mechanical and electrical energy connected with the diaphragm.

14. A diaphragm having a velocity of propagation of transverse-wave vibration dependent upon the frequency of vibration and having a dimension in the direction of propagation of said transverse waves large in comparison with the wavelength of said transverse vibration, the said diaphragm being disposed in a medium at an angle to a sound beam in the medium such that the velocity of propagation of transverse vibration in the diaphragm has a component in the direction of the sound beam equal to the velocity of the sound beam, an interconverter of mechanical and electrical energy connected with the diaphragm, and means for dissipating vibrational energy at one end of the diaphragm.

15. A method of preventing reflection of transverse waves at a boundary of a transversely vibratory diaphragm and of rendering the diaphragm unidirectionally sensitive that comprises dissipating the residual energy of the transverse vibration of the diaphragm at said boundary of the diaphragm by clamping the diaphragm near said boundary in sound-absorbing material.

16. A method of preventing reflection of transverse waves at a boundary of a transversely vibratory diaphragm having a dimension in the direction of propagation of said transverse waves large in comparison with the wavelength of said transverse vibrations in the diaphragm, the said method comprising clamping the said transversely vibratory diaphragm near said boundary in sound-absorbing material.

17. A method of preventing reflection of transverse waves in a transversely vibratory diaphragm that comprises progressively absorbing the residual energy of the transverse vibrations of the diaphragm by clamping the diaphragm in sound-absorbing material over a portion of the path of propagation of said waves therein, with progressively increasing tightness of clamping through the clamped portion of the diaphragm.

18. A method of rendering unidirectionally sensitive a diaphragm vibrating transversely in cumulative interaction with a sound beam that comprises clamping the said diaphragm near a boundary in sound-absorbing material and progressively dissipating the residual energy of said transverse vibration in said sound-absorbing material.

19. A method of cumulatively interacting between a sound beam having a predetermined direction in a sound-conducting medium and a diaphragm mechanically coupled to the medium, that comprises propagating a periodical mechanical deformation along the diaphragm with a velocity having a component, in the said predetermined direction, equal to the velocity of the beam in the medium, and dissipating the residual energy of the said vibration at one end of the diaphragm.

20. A method of preventing reflection of transverse waves at a boundary of a transversely vibratory diaphragm and of rendering the diaphragm unidirectionally sensitive that comprises dissipating the residual energy of the transverse vibration of the diaphragm at said boundary of the diaphragm by clamping the diaphragm near said boundary in sound-absorbing material with a clamping action that is progressively more rigid as the boundary is approached.

21. A method of cumulatively interacting between a sound beam having a predetermined direction in a sound-conducting medium and a transversely vibratory diaphragm equipped with an interconverter of mechanical and electrical energy and constituted of material of thickness D and satisfying the approximate relation $$V = \sqrt{fbD}$$

where V is the velocity of propagation of sound waves in the material of the diaphragm,
$f$ is the frequency of vibration of the sound waves, and
$b$ is a constant, the said method comprising positioning the diaphragm in the medium at an angle $\theta$ with a line at right angles to the said predetermined direction, such that $$\sin \theta = \frac{V_0}{V}$$

where $V_0$ is the velocity of propagation of the sound in the medium, and
V is the velocity of propagation of elastic waves in the material of the diaphragm, and dissipating the energy of vibrational waves at a boundary of the diaphragm.

22. A system for the interconversion of electric energy and the sound energy of a sound beam having a predetermined direction in a sound-conveying medium, the sound beam having a component of a given frequency, the said system comprising a diaphragm disposed in the medium at an angle to the beam such that a transverse vibration propagated along the diaphragm has a velocity component, in the said predetermined direction, equal to the velocity of the beam in the medium, and characterized by a maximum of interconversion for the said angle, and means for dissipating vibrational energy at one end of the diaphragm.

23. A method of cumulatively interacting between a sound beam having a predetermined direction in a sound-conducting medium and a diaphragm mechanically coupled to the medium, that comprises propagating a transverse vibration along the diaphragm with a velocity substantially greater than the velocity of sound in the medium and having a component, in the said predetermined direction, equal to the velocity of the beam in the medium, and rendering the diaphragm unidirectionally sensitive by dissipating the residual energy of said transverse vibration at a boundary of the diaphragm.

24. A system for the directive discrimination of a sound beam having a predetermined direction in a sound-conveying medium having a diaphragm vibratory in segments and disposed in the medium at an angle to the sound beam such that a transverse vibration propagated along the diaphragm has a velocity component, in the said predetermined direction, equal to the velocity of the beam in the medium, whereby cumulative interaction is produced between the vibrations of the segments and the vibrations of the beam, and means for preventing the reflection of transverse vibrations at predetermined boundaries.

GEORGE W. PIERCE.